United States Patent [19]
Takizawa et al.

[11] Patent Number: 5,529,477
[45] Date of Patent: Jun. 25, 1996

[54] METHOD AND APPARATUS FOR TEMPERATURE CORRECTION OF AN INJECTION MOLDING MACHINE

[75] Inventors: Michiaki Takizawa; Takashi Magario; Chiharu Nishizawa, all of Nagano, Japan

[73] Assignee: Nissei Plastic Industrial Co., Ltd., Nagano-ken, Japan

[21] Appl. No.: 305,992

[22] Filed: Sep. 19, 1994

[51] Int. Cl.[6] ................................................. B29C 45/78
[52] U.S. Cl. ........................ 425/143; 264/40.6; 425/144
[58] Field of Search ................................... 425/143, 144; 264/40.6

[56] References Cited

U.S. PATENT DOCUMENTS

| | | | |
|---|---|---|---|
| 4,480,981 | 11/1984 | Togawa et al. | 425/144 |
| 4,695,237 | 9/1987 | Inaba | 425/143 |
| 5,272,644 | 12/1993 | Katsumata et al. | 425/143 |

FOREIGN PATENT DOCUMENTS 2-55114  2/1990  Japan .

*Primary Examiner*—Tim Heitbrink

[57] ABSTRACT

A temperature correction apparatus 1 of an injection molding machine for correcting detected values $D_2$ ... obtained from a plurality of thermostats 2 ... set to an injection molding machine M and/or command values $S_2$ ... for performing temperature feedback control in accordance the detected values $D_2$ ..., comprising a correction constant computing section 11 for correcting first correction constants $P_2$ ... for the detected values $D_2$ ... and/or second correction constants $Q_2$ ... for the command values $S_2$ ... in accordance with detected values Di and Dj of the thermostats 2 ... under different temperature conditions Ti and Tj and reference values Ei and Ej corresponding to the temperature conditions Ti and Tj, a storage section 12 for storing the obtained first correction constants $P_2$ ... and/or second correction constants $Q_2$ ..., and a correction computing section 13 for correcting the detected values $D_2$ ... and/or command values $S_2$ ... in accordance with the stored first correction constants $P_2$ ... and/or second correction constants $Q_2$ ..., in order to accurately detect temperatures by eliminating the absolute error of each thermostat and the relative error between the thermostats and precisely and accurately perform the entire temperature control.

20 Claims, 2 Drawing Sheets

METHOD AND APPARATUS FOR TEMPERATURE CORRECTION OF AN INJECTION MOLDING MACHINE

FIELD OF THE INVENTION

The present invention relates to a temperature correction apparatus of an injection molding machine for correcting values of a plurality of thermostats attached to an injection molding machine.

DESCRIPTION OF THE RELEVANT ART

An existing barrel cylinder surrounding a screw and being attached to an injection molding machine, as disclosed in the official gazette of Japanese Patent Laid-Open No. 2-55114, is heated by band heaters, one each of which is attached to a front section (metering zone), an intermediate section (compression zone), and a rear section (feed zone). The heating temperature of each zone is detected by a temperature sensor corresponding to each zone and temperatures are controlled by a controller. Moreover, a temperature sensor for detecting the nozzle temperature is to an injection nozzle provided at the front end of the barrel cylinder to control the temperature of the injection nozzle. The oil temperature of a hydraulic circuit is also detected by a temperature sensor.

Because the temperature detection (temperature control) of a barrel cylinder or the like is performed at high-temperature ranges, the temperature sensor normally uses a thermostat comprising a thermocouple and a thermo-control section connected with the thermocouple.

However, the thermo-control section of a thermostat normally has an allowance of approximately ±0.3% (±1.5° C.) for the full scale (e.g. 500° C.) and a thermocouple also has an allowance of ±0.7% (±2.5° C.). Therefore, a value detected by a thermostat includes a detection error of approximately ±4° C. and the relative error between thermostats increases to the detection error or more. Moreover, a temperature distribution conforming to a predetermined pattern is desired for an injection nozzle and a barrel cylinder. However, because the relative error between thermostats increases, a deviation of the temperature distribution also increases. Thus, temperature cannot be detected accurately or the entire temperature control cannot be performed precisely and accurately.

SUMMARY OF THE INVENTION

It is an object of the present invention to provide a temperature correction apparatus of an injection molding machine, capable of accurately detecting temperatures and precisely and accurately performing the entire temperature control by eliminating the absolute error of each thermostat and the relative error between thermostats.

To achieve the above and other objects, the present invention constitutes a temperature correction apparatus of an injection molding machine for correcting detected values obtained from thermostats 2, 3, 4, 5, and 6 set to an injection molding machine and/or command values for performing temperature feedback control in accordance with the detected values. The apparatus includes a correction constant computing section for computing first correction constants for detected values and/or second correction constants for command values from detected values of the thermostats under different temperature conditions and reference values corresponding to the temperature conditions. The apparatus further includes a storage section for storing the obtained first correction constants and/or second correction constants, and a correction computing section for correcting the detected values and/or command values in accordance with the stored first correction constants and/or second correction constants. In this case, it is possible to attach a calibrated standard thermostat for obtaining the reference values to the temperature correction apparatus. Advantageously the correction computing section includes with an output correction computing section for correcting the detected values with the first correction constants and/or a setting correction computing section for correcting the command values with the second correction constants.

Therefore, it is possible to compute the first correction constants for the detected values and/or the second correction constants for the command values from the detected values obtained in accordance with the thermostats under different temperature conditions and the reference values corresponding to the temperature conditions obtained from the calibrated standard thermostat. In other words, it is possible to detect the temperature under a first temperature condition for realizing a low temperature and the temperature under a second temperature condition for realizing a high temperature by using one thermostat and the standard thermostat. Therefore, it is possible to obtain a correction characteristic "$a_1x+b$" for a detected value through computation. As a result, the first correction constant is obtained which includes a gain correction coefficient value $a_1$ and zero correction value b. Moreover, it is possible to obtain a correction characteristic "$a_2x-b$" for a command value in the same manner. As a result, the second correction constant is obtained which includes a gain correction coefficient value $a_2$ and zero correction value $-b$. Thus, the obtained first correction constants and/or the second correction constants are stored in the storage section.

When temperature is actually controlled, however, the detected values obtained from the thermostats are sent to the output correction computing section. Thereby, the detected values containing errors are corrected to original proper temperature values by the first correction constants called from the storage section and output for recording or display.

When a target temperature for performing temperature feedback control is set, the command values to be input are sent to the setting correction computing section and the command values are corrected by the second correction constants called from the storage section. Thereby, even the detected values containing errors are offset by correction values added to the command values.

DETAILED DESCRIPTION OF THE PREFERRED EMBODIMENTS

Preferred embodiments of the present invention are described below in detail by referring to the accompanying drawings.

First, an injection molding machine and a temperature control system are outlined below by referring to FIG. 2 in order to clarify the present invention.

Figure 2:
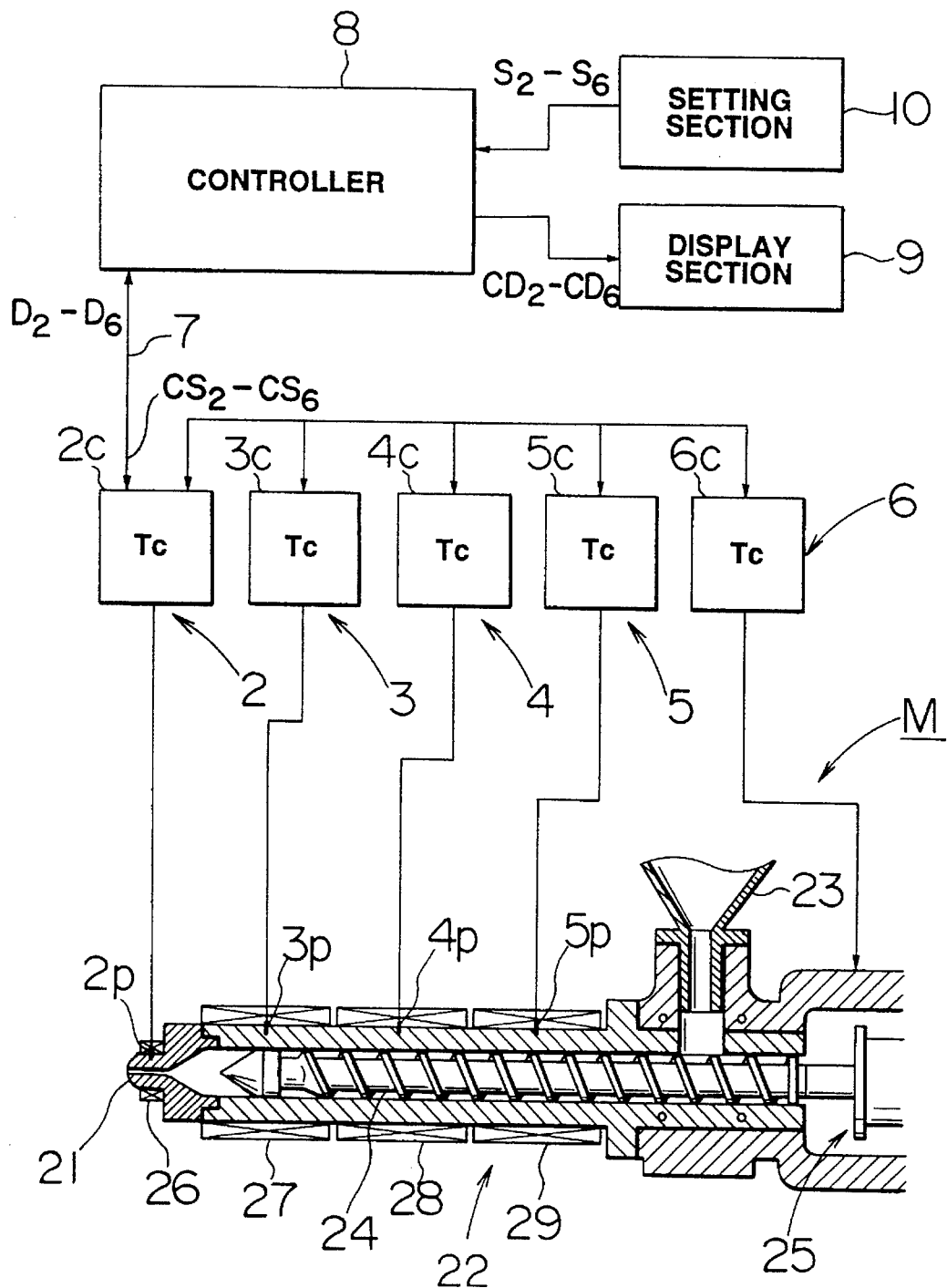
FIG. 2 is a schematic view of an injection molding machine having the temperature correction apparatus and a temperature control system.

In FIG. 2, symbol M shows a part of the injection molding machine (injection unit) excluding its die side. A barrel cylinder 22 has an injection nozzle 21 at its front end and a hopper 23 for supplying a molding material into the barrel cylinder 22 at its rear end. Moreover, a screw 24 is built in the barrel cylinder 22 and a screw driving mechanism 25 comprising a motor and a hydraulic cylinder for rotating the screw 24 or moving it forward or backward and a hydraulic circuit (not illustrated) are arranged behind the barrel cylinder 22. Furthermore, a heater 26 is attached to the injection nozzle 21. A heater 27 for heating the metering zone is attached to the front section of the barrel cylinder 22. A heater 28 for heating the compression zone is attached to the intermediate section of the cylinder 22. Finally a heater 29 for heating the feed zone is attached to the rear section of it.

Furthermore, thermocouples $2p$, $3p$, $4p$, and $5p$ are attached to the injection nozzle 21 and the front, intermediate, and rear sections of the barrel cylinder 22 respectively. A thermocouple $6p$ (shown in FIG. 1) for detecting the oil temperature is attached to a hydraulic circuit of the screw driving mechanism 25. The thermocouples $2p$–$6p$ are connected to thermo-control sections $2c$, $3c$, $4c$, 5, and $6c$ respectively. Thermostats 2, 3, 4, 5, and 6 which form counterparts to the thermocouples $2p$–$6p$ corresponding to the thermo-control sections $2c$–$6c$, respectively are provided. The thermostats 2–6 are respectively connected in a T-shaped branch by a cable such as RS-485 (trade name). The thermostat 2 serves as a master unit and is connected to a controller 8 through a communication line 7 using an optical fiber cable. The controller 8 has the same functions as a computer, and includes a computing section, a storage section, and a control section. A display section 9 having a CRT and a setting section 10 having a keyboard are connected to the controller 8.

Serial communication conforming to the polling selection method is performed between each of the thermostats 2–6 and the controller 8. Each of the thermostats 2–6 is called and selected by the controller 8 and detected values (data) $D_2$, $D_3$, $D_4$, $D_5$, and $D_6$ sent from the thermostats 2–6 are successively transmitted to the controller 8 and corrected detected values $CD_2$, $CD_3$, $CD_4$, $CD_5$ and $CD_6$ are displayed on the display section 9. Moreover, corrected command values $CS_2$, $CS_3$, $CS_4$, $CS_5$ and $CS_6$ for temperature set by the setting section 10 are transferred by the controller 8 to the thermostats 2–6. A control signal is sent from the thermo-control sections 2C, 3C, 4C, and 5C to the heaters 26, 27, 28, and 29, respectively. The heaters 26, 27, 28 and 29 are attached to the injection nozzle 21 and the metering zone (front section), compression zone (intermediate section), and feed zone (rear section) of the barrel cylinder 22 respectively. Thus, temperature feedback control is performed.

Figure 1:
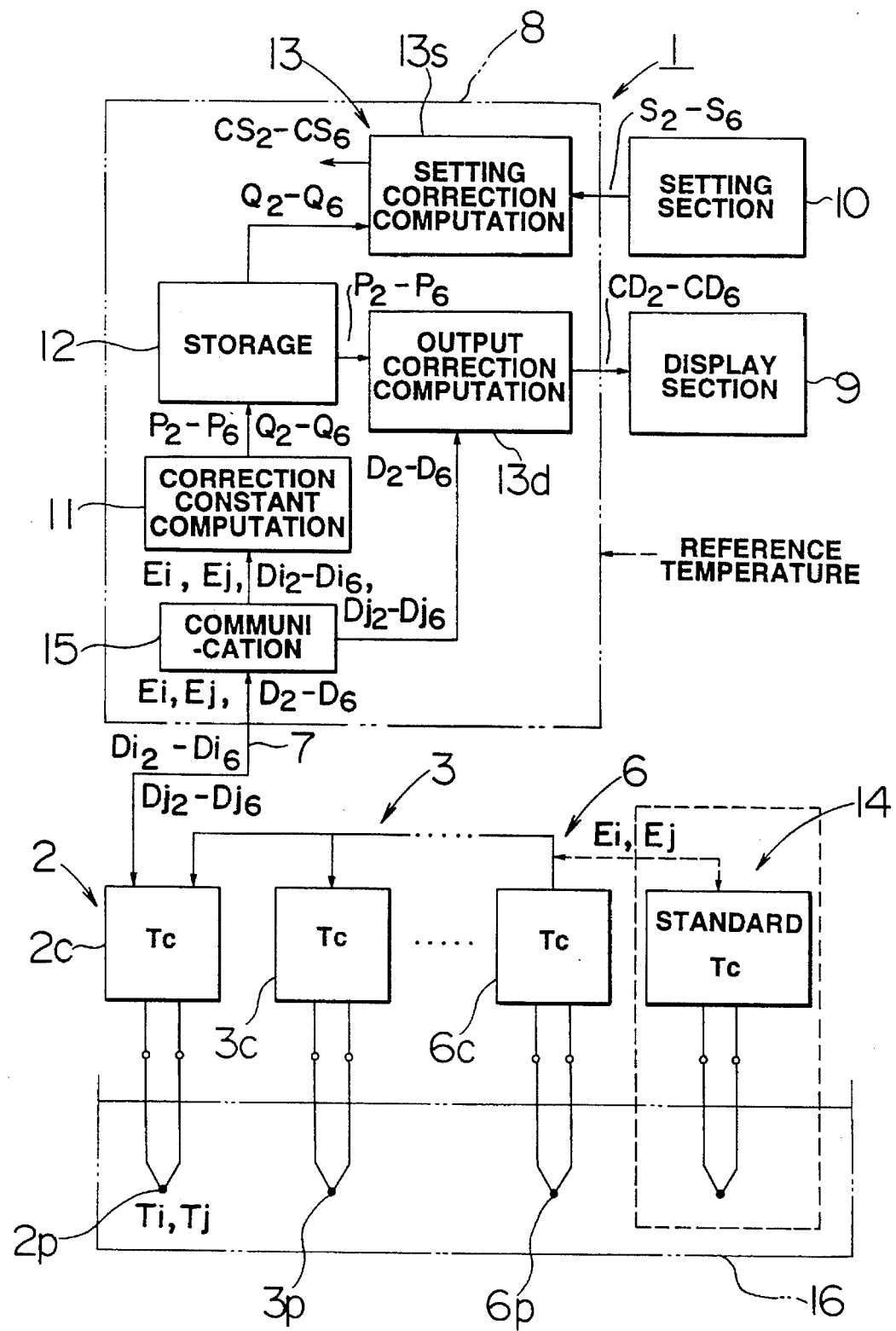
FIG. 1 is a functional block circuit diagram of the temperature correction apparatus of the present invention.

The temperature correction apparatus 1 of the present invention is described below by referring to FIGS. 1 and 2. In FIG. 1, identical elements are provided with the same symbol.

First, a standard thermostat 14 is connected to the thermostats 2–6 via a T-shaped branch similarly to the connection of the thermostats 2–6. The standard thermostat 14 is previously accurately calibrated so that no error occurs.

The controller 8 with includes a correction constant computing section 11 for computing the first correction constants $P_2$–$P_6$ for the detected values $D_2$–$D_6$ and the second correction constants $Q_2$–$Q_6$ for the command values $S_2$–$S_6$. The correction constant computing section 11 has a function for computing the first correction constants $P_2$–$P_6$ and the second correction constants $Q_2$–$Q_6$. In accordance with the detected values obtained from the thermostats 2–6 under two different predetermined temperature conditions Ti (low temperature) and Tj (high temperature) and the reference values Ei and Ej obtained from the standard thermostat 14. The arithmetic processing by the correction constant computing section 11 can be executed by software (program) according to the computer function. The detected values $Di_2$–$Di_6$ and $Dj_2$–$Dj_6$, and the reference values Ei and Ej at the predetermined temperature conditions are input through a communication interface 15.

Moreover, a storage section 12 built in the controller 8, has a function for storing the first correction constants $P_2$–$P_6$ and the second correction constants $Q_2$–$Q_6$ sent from the correction constant computing section 11. A correction computing section 13 corrects the detected values $D_2$–$D_6$ and the command values $S_2$–$S_6$ in accordance with the first correction constants $P_2$–$P_6$ and the second correction constants $Q_2$–$Q_6$ stored in the controller 8. The correction computing section includes an output correction computing section $13d$ and a setting correction computing section $13s$. The arithmetic processings by the computing sections $13d$ and $13s$ can be executed by software (program) according to the computer function. The output correction computing section $13d$ corrects the detected values $D_2$–$D_6$ with the first correction constants $P_2$–$P_6$ and sends the corrected detected values $D_2$–$D_6$ to the display section 9. The setting correction computing section $13s$ corrects the command values $S_2$–$S_6$ set by the setting section 10 with the second correction constants $Q_2$–$Q_6$ and sending the corrected command values $S_2$–$S_6$ to the temperature control section of the controller 8.

The following is the description of the general functions and operations of the temperature correction apparatus 1.

First, the thermocouples $2p$–$6p$ attached to the thermostats 2–6 and the standard thermostat 14 are soaked in a heating medium whose temperature can be adjusted, such as the oil in an oil tank 16. Then, the first correction constants $P_2$–$P_6$ for the detected values $D_2$–$D_6$ and the second correction constants $Q_2$–$Q_6$ for the command values $S_2$–$S_6$ are computed by the correction constant computing section 11 in accordance with the detected values $Di_2$–$Di_6$ and $Dj_2$–$Dj_6$ obtained from the thermostats 2–6 under the temperature condition Ti for realizing a low temperature and the temperature condition Tj for realizing a high temperature, and the reference values Ei and Ej obtained from the calibrated standard thermostat 14.

As an example, when a correction constant for the thermostat 2 is computed, temperatures under the low temperature condition Ti and high temperature condition Tj are detected from the thermostat 2 and the standard thermostat 14. Therefore, the correction characteristic "$a_1x+b$" for a detected value obtained from the thermostat 2 is obtained and thereby the first correction constant $P_2$ having the gain correction coefficient value $a_1$ and the zero correction value b is obtained. Similarly, the correction characteristic "$a_2x-b$" for a command value is obtained and thereby the second correction constant $Q_2$ having the gain correction coefficient value $a_2$ and the zero correction value $-b$, where x is the command value is obtained. The temperature conditions Ti (low temperature) and Tj (high temperature) are set by adjusting the oil temperature of the oil tank 16.

The obtained first correction constants $P_2$–$P_6$ and the second correction constants $Q_2$–$Q_6$ are stored in the storage section 12.

To control actual temperatures, the detected values $D_2$–$D_6$ obtained from the thermostats 2–6 are sent to the output correction computing section 13d through the communication interface 15. Thereby, the detected values $D_2$–$D_6$, including errors, are retrieved from the storage section 12, corrected to original accurate temperature values by the first correction constants $P_2$–$P_6$ and displayed on the display section 9.

To set a target temperature for performing temperature feedback control, input command values $S_2$–$S_6$ are sent to the setting correction computing section 13s and the command values $S_2$–$S_6$ are corrected by the second correction constants $Q_2$–$Q_6$ retrieved from the storage section 12. Therefore, even when the detected values $D_2$–$D_6$ include errors, these errors are offset by correction values added to the command values $S_2$–$S_6$ and the corrected command values $CS_2$–$CS_6$ are sent to and stored in a predetermined storage section or the like. Thus, when temperature is controlled, the detected values $D_2$–$D_6$ are controlled so that the deviations between the corrected command values $S_2$–$S_6$ and the detected values $D_2$–$D_6$ obtained from the thermostats 2–6 are decreased to zero. Therefore, resultingly, an original accurate temperature value (target temperature) is obtained.

An embodiment is described above in detail. However, the present invention is not restricted to the embodiment. For example, as long as accurate temperature conditions are secured for thermostats, it is possible to directly send a reference temperature value to a controller without using a standard thermostat. Moreover, it is possible to manually send a temperature value to the controller by measuring temperature conditions with an accurate thermometer instead of the standard thermostat. Furthermore, it is possible to output a corrected detected value for recording or communication instead of displaying it on a display section. Furthermore, it is possible to detect temperatures at three points or more instead of detecting them at two points. Furthermore, it is possible to control temperatures with the controller by using a temperature sensor for only detecting temperatures instead of a thermostat. Therefore, the thermostat of the present invention also includes every type of normal temperature sensor for only detecting temperatures. Moreover, it is possible to modify the detailed constitution and technique of the present invention as long as the modification conforms to the gist of the present invention.

What is claimed is:

1. A method of temperature correction for a machine having a plurality of thermostats attached thereto comprising the steps of:

subjecting the thermostats to predetermined temperature conditions;

generating a reference temperature value for each predetermined temperature condition;

computing a plurality of correction constants, each correction constant being computed in accordance with values output by a corresponding thermostat of the thermostats during said subjecting step and reference temperature values from said generating step;

storing correction constants obtained from said computing step; and correcting, during operation of the machine, temperature dependent values in accordance with the correction constants.

2. The method of temperature correction according to claim 1, wherein the temperature dependent values are at least one of detected values obtained from the thermostats and command values obtained from a setting section for performing temperature feedback control.

3. The method of temperature correction according to claim 2, wherein, when the temperature dependent values are detected values, said computing step comprises obtaining a plurality of first correction constants, each first correction constant being expressed by a first linear function $a_1 x_1 + b_1$ in accordance with detected values obtained from a corresponding thermostat under the predetermined temperature conditions and the reference temperature value for each predetermined temperature condition, wherein the first linear function includes a gain correction coefficient value $a_1$ and a zero correction value $b_1$ and wherein $x_1$ represents a detected value obtained by the corresponding thermostat during operation of the machine.

4. The method of temperature correction according to claim 3, wherein, when the temperature dependent values further include command values, said computing step further comprises obtaining a plurality of second correction constants, each second correction constant being expressed by a second linear function $a_2 x_2 - b_2$ in accordance with detected values obtained by a corresponding thermostat under the predetermined temperature conditions and the reference temperature value for each predetermined temperature condition wherein the second linear function includes a gain correction coefficient value $a_2$ and a zero correction value $b_2$ and wherein $x_2$ represents a command value for the corresponding thermostat.

5. The method of temperature correction according to claim 2, wherein, when the temperature dependent values are command values, said computing step comprises obtaining each correction constant expressed by a linear function $ax - b$ in accordance with detected values obtained by a corresponding thermostat under the predetermined temperature conditions and the reference temperature value for each predetermined temperature condition, wherein the linear function includes a gain correction coefficient value a and a zero correction value b and wherein x represents a command value for the corresponding thermostats.

6. The method of temperature correction according to claim 1, wherein said subjecting step comprises soaking the thermostats in oil and adjusting a temperature of the oil.

7. A temperature correction apparatus for use with an injection molding machine for correcting detected values obtained from a plurality of thermostats comprising:

means for providing predetermined temperature conditions to the plurality of thermostats;

means for outputting a reference temperature value for each of said predetermined temperature conditions;

a correction constant computing section which computes a plurality of first correction constants, wherein each first correction constant corrects corresponding detected values obtained from a corresponding thermostat of the plurality of thermostats attached to the machine under said predetermined temperature conditions and said reference temperature value corresponding to each predetermined temperature condition;

a storage section which stores the first correction constants; and a correction computing section which corrects detected values during operation of the machine in accordance with the stored first correction constants.

8. The temperature correction apparatus according to claim 7, wherein said means for outputting includes a calibrated standard thermostat in said plurality of thermostats, said calibrated standard thermostat providing said reference temperature values for each of said predetermined temperature conditions.

9. The temperature correction apparatus according to claim 7, wherein each first correction constant is expressed by a linear function $a_1x+b$ in accordance with a corresponding detected value obtained by a corresponding thermostat under said predetermined temperature conditions and the reference temperature value corresponding to each predetermined temperature condition, wherein said linear function comprises a gain correction coefficient value $a_1$ and a zero correction value b and wherein x represents a value detected by said corresponding thermostat during operation of machine.

10. The temperature correction apparatus according to claim 7, wherein the temperature correction apparatus further corrects command values for performing temperature feedback control and said correction constant computing section further computes a plurality of second correction constants, wherein each second correction constant corrects the command values for performing temperature feedback control in accordance with values detected by a corresponding thermostat of the plurality of thermostats under said predetermined temperature conditions and said reference temperature value for each predetermined temperature condition, said storage section further stores said second correction constants, and said correction computing section further comprises a setting correction computing section which corrects the command values in accordance with stored second correction constants.

11. The temperature correction apparatus according to claim 7, wherein the correction computing section has an output correction computing section for correcting a detected value obtained by a corresponding thermostat during operation of the machine in accordance with the corresponding first correction constant and for outputting a corrected detected value for further processing.

12. The temperature correction apparatus according to claim 10, wherein the setting correction computing section outputs a corrected command value to a thermo-control section of each thermostat.

13. The temperature correction apparatus according to claim 7, wherein said means for providing includes a temperature-adjustable oil tank which allows each thermostat to be soaked in oil thereby providing said different predetermined temperature conditions.

14. The temperature correction apparatus according to claim 10, wherein each second correction constant is expressed by a linear function $a_2x-b$ in accordance with a corresponding detected value obtained by a corresponding thermostat under said predetermined temperature conditions and said reference temperature value corresponding to each predetermined temperature condition, wherein said second linear function includes a gain correction coefficient value $a_2$ and a zero correction value b and wherein x represents a command value for the corresponding thermostat.

15. The temperature correction apparatus of an injection molding machine according to claim 11, wherein said further processing includes displaying said corrected detected value.

16. A temperature correction apparatus, for use with an injection molding machine having a plurality of thermostats attached thereto, for correcting command valves for performing temperature feedback control, comprising:

means for providing predetermined temperature conditions to the plurality of thermostats;

means for outputting a reference temperature value for each of said predetermined temperature conditions;

a correction constant computing section which computes a plurality of correction constants, wherein each correction constant corrects command values in accordance with values detected by a corresponding thermostat of the plurality of the thermostats under said predetermined temperature conditions and said reference temperature value for each predetermined temperature condition, said command values performing temperature feedback control in accordance with the detected values;

a storage section which stores said correction constants; and a correction computing section which corrects the command values in accordance with stored correction constants.

17. The temperature correction apparatus according to claim 16, wherein said means for outputting includes a calibrated standard thermostat included in the plurality of thermostats, said calibrated standard thermostat providing a reference temperature values.

18. The temperature correction apparatus according to claim 16, wherein each correction constant is expressed by a linear function $ax-b$ in accordance with values detected by a corresponding thermostat under the predetermined temperature conditions and the reference temperature value corresponding to each predetermined temperature condition, wherein said linear function includes a gain correction coefficient value a and a zero correction value b and wherein x represents a command value for the corresponding thermostat.

19. The temperature correction apparatus according to claim 16, wherein the setting correction computing section outputs a corrected command value to a thermo-control section of each thermostat.

20. The temperature correction apparatus according to claim 16, wherein said means for providing includes a temperature-adjustable oil tank which allows each thermostat to be soaked in oil thereby providing said predetermined temperature conditions.

\* \* \* \* \*